(12) United States Patent  
Parker et al.

(10) Patent No.: US 9,109,967 B2
(45) Date of Patent: Aug. 18, 2015

(54) IRREVERSIBLE HYDROSTATIC PRESSURE INDICATOR

(76) Inventors: Robert Parker, Bend, OR (US); Daniel J. Volk, Alpharetta, GA (US)

( * ) Notice: Subject to any disclaimer, the term of this patent is extended or adjusted under 35 U.S.C. 154(b) by 586 days.

(21) Appl. No.: 13/473,391

(22) Filed: May 16, 2012

(65) Prior Publication Data

US 2012/0291558 A1 Nov. 22, 2012

Related U.S. Application Data

(60) Provisional application No. 61/487,001, filed on May 17, 2011.

(51) Int. Cl.
*G01L 7/00* (2006.01)
*G01L 7/18* (2006.01)
(52) U.S. Cl.
CPC ........................................ *G01L 7/187* (2013.01)
(58) Field of Classification Search
None
See application file for complete search history.

(56) References Cited

U.S. PATENT DOCUMENTS

| 2,684,593 | A | * | 7/1954 | Rothstein | 73/747 |
| 3,523,451 | A | * | 8/1970 | Kohn | 73/146.8 |
| 3,789,669 | A | * | 2/1974 | Passman | 73/744 |
| 4,530,496 | A | * | 7/1985 | Smith et al. | 482/112 |
| 4,770,044 | A | * | 9/1988 | Ferris | 73/744 |
| 4,829,829 | A | * | 5/1989 | Ferris | 73/744 |
| 5,284,060 | A | * | 2/1994 | Martinez | 73/707 |
| 6,528,277 | B1 | * | 3/2003 | Hendricks et al. | 435/31 |
| 8,033,176 | B2 | * | 10/2011 | Esnouf | 73/716 |
| 2003/0070487 | A1 | * | 4/2003 | DaCosta et al. | 73/708 |

* cited by examiner

*Primary Examiner* — Peter Macchiarolo
*Assistant Examiner* — Jermaine Jenkins
(74) *Attorney, Agent, or Firm* — Laurence P. Colton; Smith Risley Tempel Santos LLC

(57) ABSTRACT

An irreversible pressure indicator, comprising a sealed vessel forming a fluid chamber and at least one indicating chamber; an indicating material contained within the fluid chamber, said material capable of being acted upon by a pressure force; and a gas contained within the indicating chamber, said gas capable of being displaced or compressed by said indicating material, and a method for using the same.

22 Claims, 11 Drawing Sheets

IRREVERSIBLE HYDROSTATIC PRESSURE INDICATOR

STATEMENT OF RELATED APPLICATIONS

This patent application claims the benefit of and priority on U.S. Provisional Patent Application No. 61/487,001 having a filing date of 17 May 2011.

BACKGROUND OF THE INVENTION

1. Technical Field

This invention is related generally to the field of pressure indicators and more specifically to the field of hydrostatic pressure indicators for showing if a certain pressure has been reached and/or if an item has been subjected to a certain pressure.

2. Prior Art

The use of high pressure pasteurization has become a standard method for destroying bacteria in foods. Current normal methods such as heating foods to destroy bacteria are known, and can alter the taste and texture of certain foods. For example, sliced lunch meats, such as turkey and chicken, and guacamole will be altered if exposed to high temperatures.

High pressure pasteurization or sterilization methods also are known. For example, foods and other items are packaged in sealed flexible poly bags. The bagged food then can be placed in an autoclave and hydrostatically pressurized using water as a medium to achieve a pressure of 85,000 psi for a period of time. Such a pressure will destroy the bacteria, thus increasing the shelf life of the bagged food. However, if the food did not get properly pressurized and was placed on the shelf and had active bacteria that caused sickness in consumers, it might result in a total recall of the packages. Because of this possibility, it is desirable to have an inexpensive irreversible indicator to show that every package had been exposed to 85,000 psi or any other desired pressure.

BRIEF SUMMARY OF THE INVENTION

Briefly, the present invention is a device and method for use with high pressure sterilization and pasteurization techniques. The inventive device visually indicates whether a certain pressure has been reached and the inventive method uses the inventive device in connection with, for example, food products during a high pressure process.

The basic concept uses Boyles Law, namely that the volume of a gas will change in a linear fashion when compressed by pressure:

$$V_2 = (P_1/P_2)V_1.$$

Where $V_2$ is the final volume of a gas pressurized to a pressure of $P_2$,
$P_1$ is the initial pressure, and
$V_1$ is the initial volume.

The concept uses a preferably incompressible viscous fluid such as a grease or petroleum jelly, other incompressible or nearly incompressible (minimally compressible) materials, or materials capable of being acted upon by a pressure force (all suitable materials will be referred to herein as "incompressible fluid"), encased in a flexible chamber that is adjoining at least one transparent sealed chamber filled with a gas such as air. When hydrostatic pressure is applied to the flexible chamber, the incompressible fluid is squeezed, much like a tube of toothpaste, out of the flexible chamber and into the adjoining transparent gas filled chamber, compressing the gas in that chamber until equilibrium is reached. The incompressible fluid thus provides a visual indication that a certain, desired pressure has been reached.

The device is attached to or included with an item to be subjected to high pressure sterilization or pasteurization. After the item has been subjected to high pressure sterilization or pasteurization, one can visually determine whether the item has been subjected to a pressure high enough to destroy harmful bacteria by viewing the presence of or progress of the incompressible fluid in the transparent gas filled chamber.

A complete understanding of the present invention may be obtained by reference to the accompanying drawings, when considered in conjunction with the subsequent, detailed description of preferred embodiments in which like elements and components bear the same designations and numbering throughout the figures.

DETAILED DESCRIPTION OF PREFERRED EMBODIMENTS

Figure 1A:
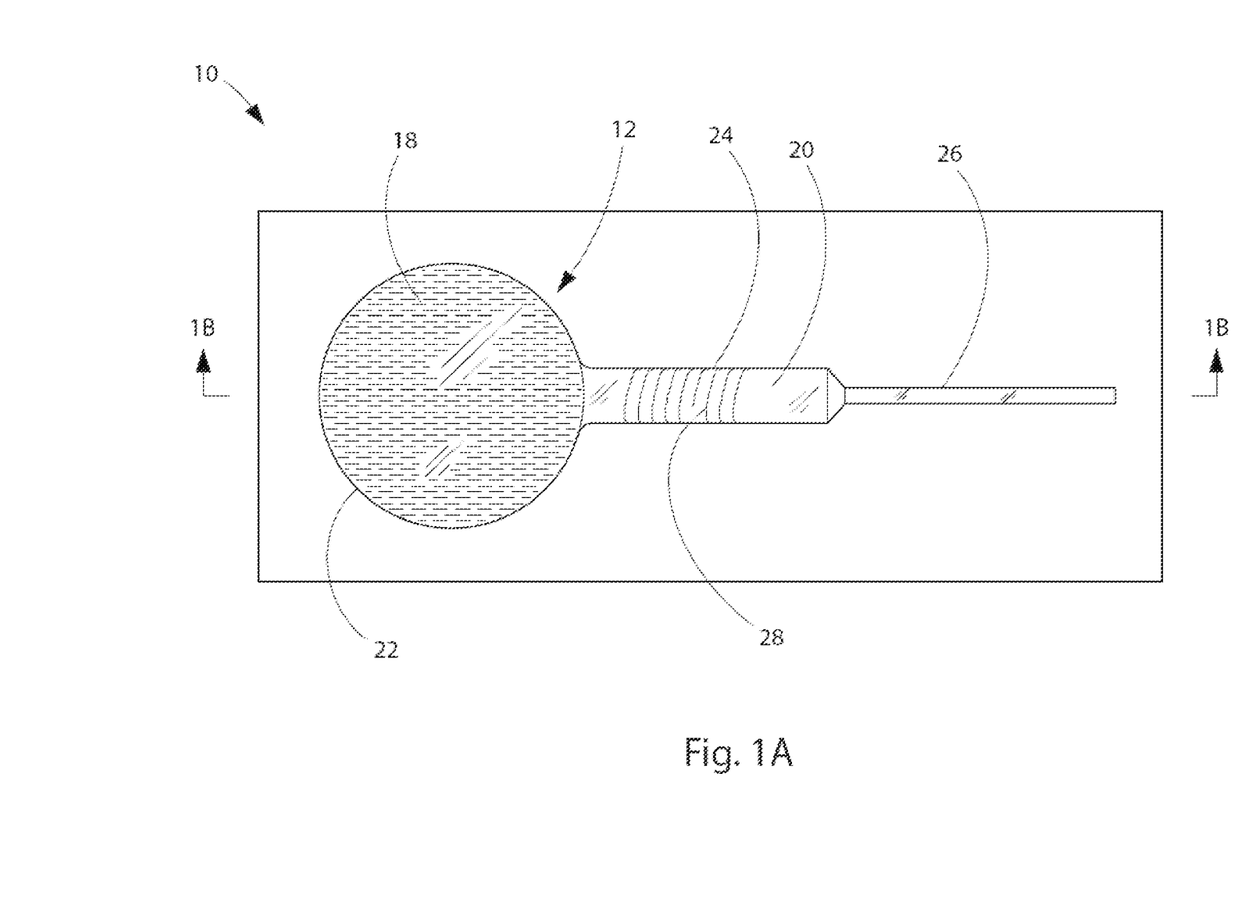
FIG. 1A shows a top view of a first embodiment of the indicator of the present invention.
Figure 1B:
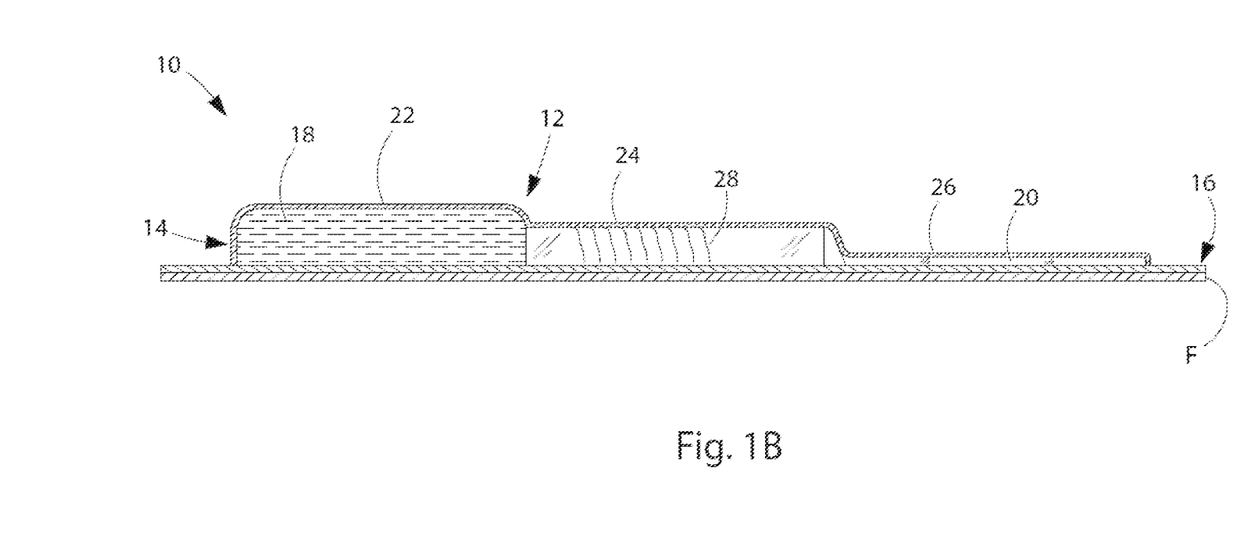
FIG. 1B shows a side cross sectional view of the indicator of FIG. 1A along line 1B-1B of FIG. 1A.

FIG. 1A shows a top view of a first embodiment of the indicator device 10 of the present invention prior to exposure to some hydrostatic pressure. FIG. 1B shows a side cross sectional view of the indicator device 10 of FIG. 1A. Vessel 12 comprises first chamber 22 filled with an incompressible fluid 18, such as grease or petroleum jelly, which is very viscous. The incompressible fluid 18 is housed in first chamber 22, which is relatively flimsy so that upon being subjected to pressure, first chamber 22 will easily compress and extrude the incompressible fluid 18 into second chamber 24. Second chamber 24 is a gas-filled chamber and is preferably transparent. The gas 20 can be air or any other gas 20 that can be compressed by the incompressible fluid 18. Second chamber 24 is considerably stiffer than first chamber 22 such that second chamber 24 will not be affected, or will be minimally effected relative to first chamber 22, by the increase in pressure.

As can be seen, first chamber 22 is a round structure that can have a dome-like structure top surface. Second chamber 24 is a relatively linear or tubular structure extending from and in fluid communication with first chamber 22. Thus, incompressible fluid 18 in first chamber 22 can be forced by pressure from first chamber 22 into second chamber 24. Third chamber 26 also is a relatively linear or tubular structure extending from and in fluid communication with second chamber 24. Third chamber 26 is attached to second chamber 24 on an end of second chamber 24 opposite from where second chamber 24 is attached to first chamber 22. Thus, incompressible fluid 18 can move from second chamber 24 into third chamber 26 should the pressure on first chamber 22 be sufficient. Third chamber 26 preferably has a cross-section or diameter smaller than the cross-section or diameter of second chamber 24. In effect, second chamber 24 can show the gross progress of incompressible fluid 18 and third chamber 26 can show the fine progress of incompressible fluid 18.

The vessel 12 can be formed by using a thin film material that is heated and vacuum formed, or by injection molding, or by any other suitable method. After filling first chamber 22 with the incompressible fluid 18, the indicator device 10 also can be heat sealed with a film F (FIG. 1B) which further stiffens the chambers, specifically chambers 24 and 26, as discussed in more detail herein.

Figure 2A:
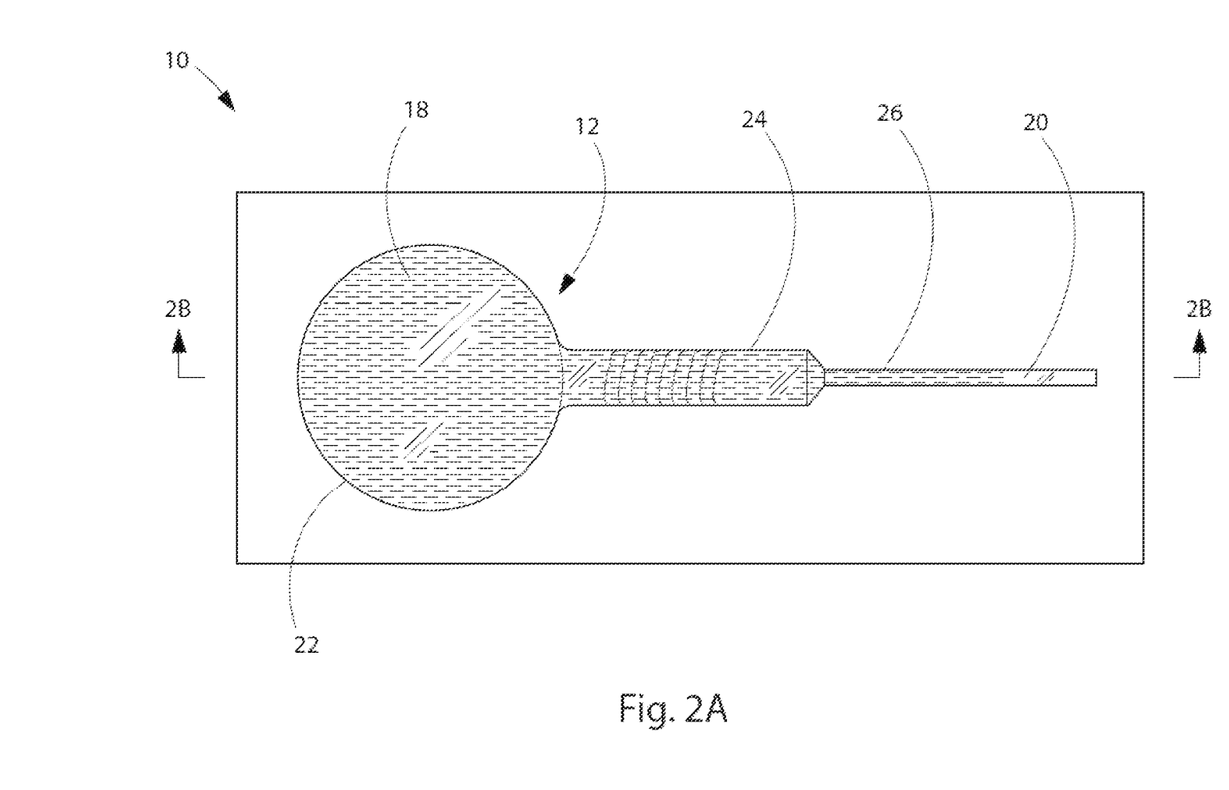
FIG. 2A shows a top view of the indicator of FIG. 1A after exposure to some hydrostatic pressure.

FIG. 2A shows a top view of the indicator device 10 of FIG. 1A after exposure to some hydrostatic pressure. As pressure is applied to the indicator device 10, first chamber 22 is compressed, thus forcing incompressible fluid 18 out of first chamber 22 into at least second chamber 24. As second chamber 24 is filled with incompressible fluid 18, the pressure in second chamber 24 and particularly also in third chamber 26 can be increased by, for example, 1000 atmospheres if the volume ratio of second chamber 24 to third chamber 26 is 1000 times, based on the empirical equation $P_1V_1=P_2V_2$. Further compression of first chamber 22 will cause more of the incompressible fluid 18 to be extruded into second chamber 24 and then into third chamber 26, further compressing the gas 20 in second chamber 24 (if incompressible fluid 18 does not fill second chamber 24) and third chamber 26 so that equilibrium is reached between the ambient outside the indicator device 10 the inside of the indicator device 10, and particularly inside chambers 24 and 26. The distance "e" shown in FIG. 2A will represent the external pressure, that is, the pressure being exerted on first chamber 22 so as to force the incompressible fluid 18 out of first chamber 22. Second and third chambers 24, 26 will not collapse because the internal and external pressures will be in equilibrium.

Figure 2B:
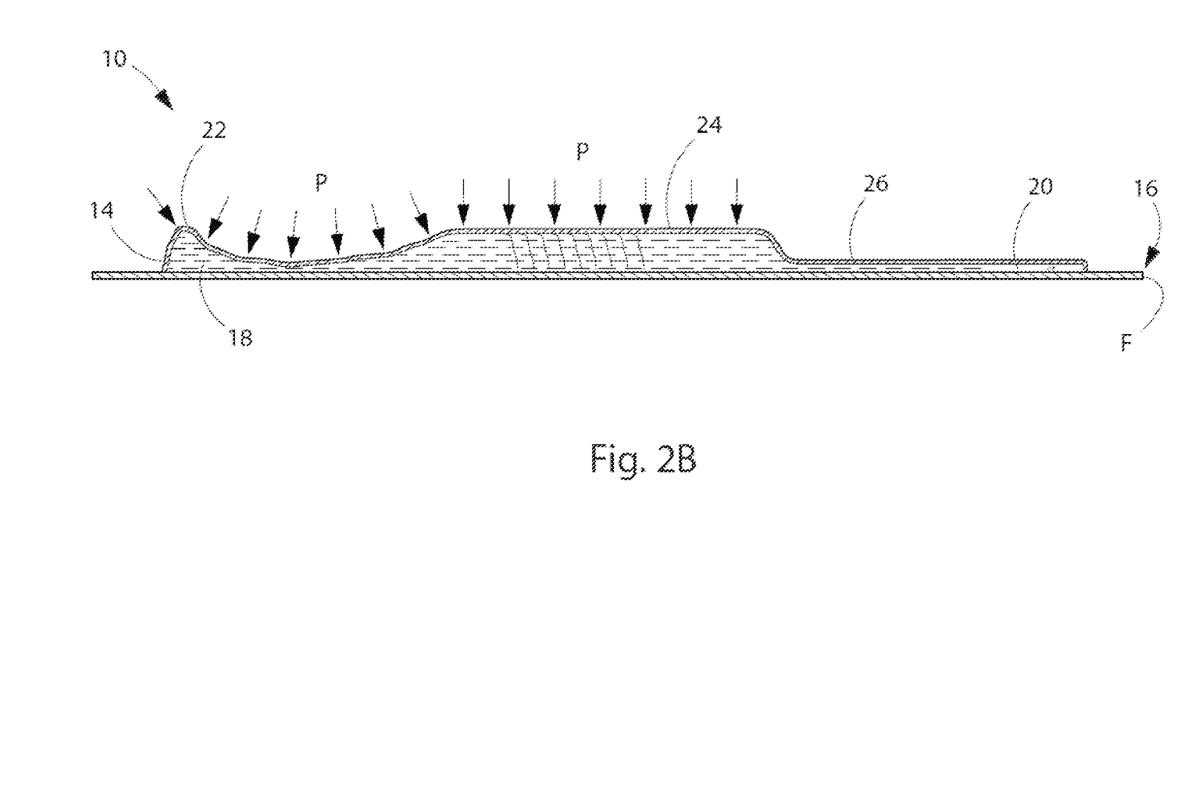
FIG. 2B shows a side cross-sectional view of the indicator of FIG. 1B after exposure to pressure along line 2B-2B of FIG. 2A.

FIG. 2B shows a side cross-sectional view of the indicator of FIG. 1B after exposure to pressure. More specifically, FIG. 2B shows how first chamber 22 has been compressed under pressure and how the incompressible fluid 18 is extruded from first chamber 22 into second and third chambers 24, 26.

The vessel 12 of the indicator device 10, including chambers 22, 24, and 26, preferably is formed by using transparent polymer films having a thickness of about, but not limited to, 0.003-0.0120 inches thick. The vessel 12 can be formed by vacuum forming, injection molding, or other suitable forming techniques. The vessel 12 can be formed of two or more pieces of material, a top piece 14, a bottom piece 16, and optional film F. For example, top piece 14 can have the structural features of chambers 22, 24, 26, while bottom piece 16 can be a planar piece.

After manufacturing top piece 14, incompressible fluid 18 can be placed in first chamber 22 and top piece 14 can be mounted on bottom piece 16 forming the completed indicator device 10. Top piece 14 and bottom piece 16 must be suitably mounted together to prevent incompressible fluid 18 or gas 20 from being able to pass between the pieces and escaping from the indicator device 10. Suitable heat welding or sonic welding techniques, pressure welding techniques, adhesives, or the like, can be used.

Alternatively, top piece 14 and bottom piece 16 can be mounted together prior to the introduction of incompressible fluid 18 and/or gas 20 into first chamber 22 and second and third chambers 24, 26, respectively. Incompressible fluid 18 and gas 20 then can be introduced into the vessel 12 using a syringe-type device inserted between the top piece 14 and the bottom piece 16. Any channels created between the top piece 14 and the bottom piece 16 can be sealed using the sealing techniques mentioned herein.

Also alternatively, top and bottom piece 16 can be manufactured as a single piece having a hollow interior corresponding to chambers 22, 24, 26. Incompressible fluid 18 and gas 20 then can be introduced into the vessel 12 using a syringe-type device inserted through the chamber walls. Any channels created through the chamber walls can be sealed using the sealing techniques mentioned herein.

Should it be desired to use a gas 20 other than air within second and third chambers 24, 26, air contained within second and third chambers 24, 26 during manufacture can be removed using a syringe-type device inserted between the top piece 14 and the bottom piece 16, or through the chamber walls, and the desired gas 20 can be injected into second and third chambers 24, 26 in the same manner. Any channels created between the top piece 14 and the bottom piece 16, or through the chamber walls, can be sealed using the sealing techniques mentioned herein.

The interior surface of second and third chambers 24, 26 can have a scratched or roughened internal surface 28, as represented in the FIGS. Such a roughened internal surface 28 will appear white because of the light scattering effect. As the incompressible fluid 18 wets the roughened internal surface 18, the roughened internal surface will change in color or visual effect from white to clear due to the change in the light scattering effect, and will show visually how far the incompressible fluid 18 has traveled into second chamber 24 and possibly third chamber 26. Thus, the incompressible fluid 18 will coat the inside of second chamber 24 and possibly third chamber 26 up to a certain distance. The distance the incompressible fluid 18 travels inside second chamber and possibly third chamber 26 will give an indication of such a distance traveled even if the incompressible fluid 18 retreats due to a change in the internal pressure. This is necessary because upon removal of the external pressure on the indicator device 10, and particularly the first chamber 22, the gas 20 trapped in third chamber 26 and possibly in second chamber 24 can push the incompressible fluid 18 back out of third chamber 26 and possibly second chamber 24.

Incompressible fluid 18 can be loaded with carbon and/or other powder pigments to leave an indication of the maximum displacement in third chamber 26. A fine coating of white powder on the internal surface of second chamber 24 and/or third chamber 26 also will record the maximum displacement of incompressible fluid 18 within second chamber 24 and/or third chamber 26.

In order to increase the sensitivity of the indicator device 10, the third chamber 26 can be made quite small and sensitive to pressure changes of about 1% even at pressures of 85,000 psi. By arranging the volumetric structure of the third chamber 26 the sensitivity of the indicator device 10 can be enhanced. The volume in the first chamber 22 preferably should be about three times the volume in second and third chambers 24, 26 combined. While the second and third chambers 24, 26 shown in FIG. 1A and FIG. 1B are linear, it is possible to make them circular chambers that can be formed around first chamber 22, as also disclosed herein.

The indicator device 10 disclosed will be calibrated based on the volumes of the chambers 22, 24, 26, the incompressible fluid 18 used, and the gas 20 used. For example, the incompressible fluid 18 will experience shear and friction during the extrusion process. Additionally, the specific properties of the incompressible fluid 18 and the gas 20 used will necessitate calibration.

Figure 3A:
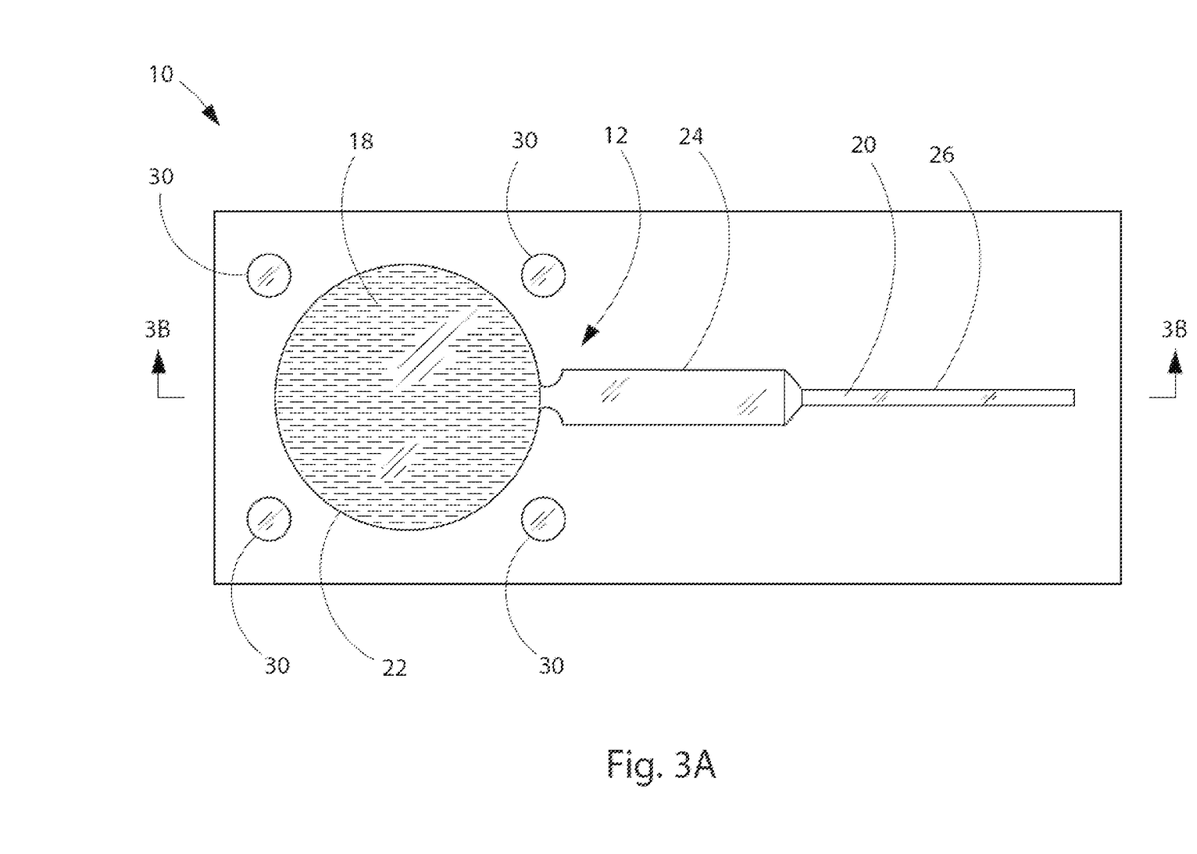
FIG. 3A shows a top view of a second embodiment of the indicator of the present invention.
Figure 3B:
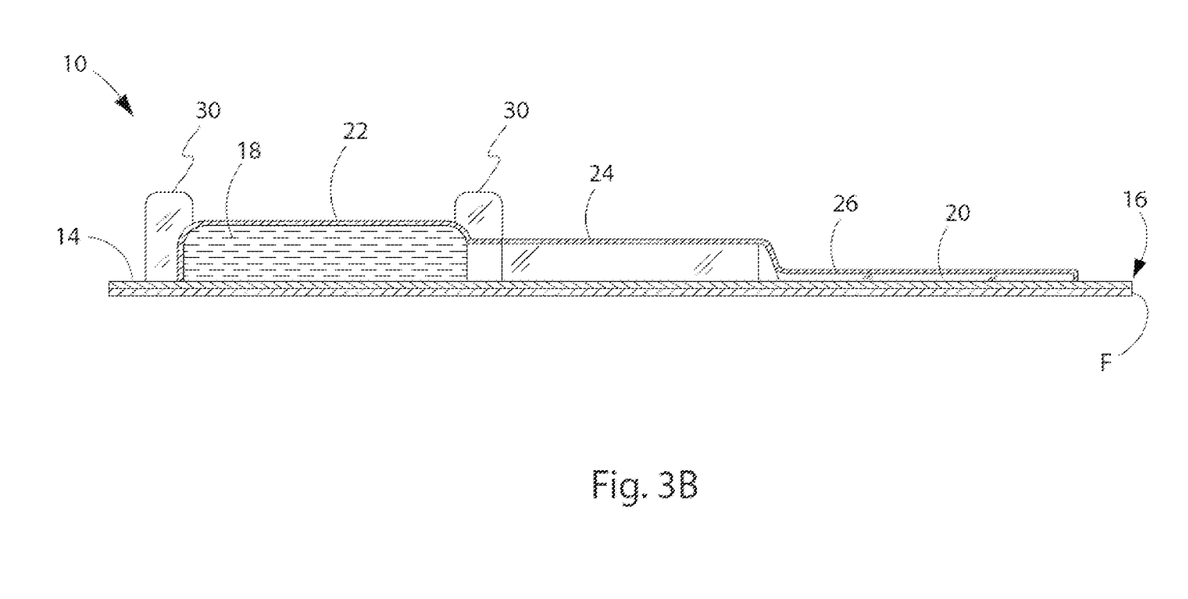
FIG. 3B shows a side cross sectional view of the indicator of FIG. 3A along line 3B-3B of FIG. 3A.

FIG. 3A shows a top view of a second embodiment of the indicator device 10 of the present invention. FIG. 3B shows a side cross sectional view of the indicator device 10 of FIG. 3A. In this embodiment, to prevent inadvertent extrusion of the incompressible fluid 18 from the first chamber 22 due to mechanical pressure on the first chamber 22, the indicator device 10 may be formed with columns 30. For example, mechanical pressure can be inadvertently applied to the first chamber 22 if the devices 10 are stacked for storage or transportation. Columns 30 are formed from the same material as, and as a part of, top piece 14. Alternatively, columns 30 can be formed from a different material from, not as a part of, and as an addition to top piece 14.

FIG. 3A also illustrates a valve or constriction 32, which may be formed to prevent inadvertent flow of the incompressible fluid 18 from the first chamber 22. For example, constriction 32 can be designed to prevent the extrusion of the incompressible fluid from the first chamber 22 if a certain relatively low pressure is applied to the first chamber 22. However, upon exposure to high hydrostatic pressure, the incompressible fluid 18 will force the constriction apart and the incompressible fluid 18 then can flow into the adjoining second chamber 24 and compress the gas 20 in the third chamber 26.

Figure 4A:
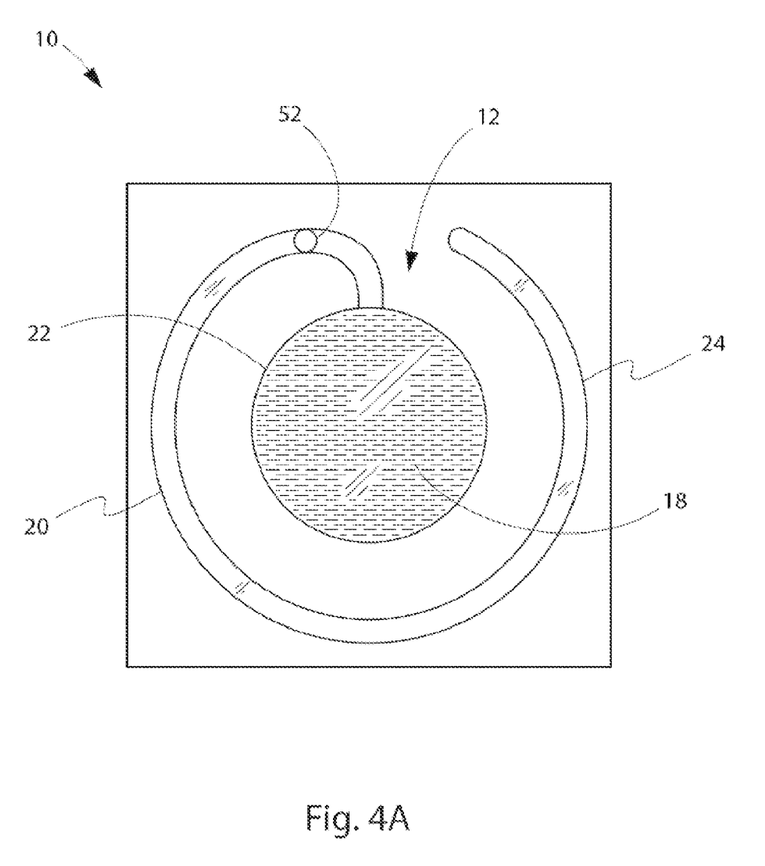
FIG. 4A shows a top view of a third embodiment of the indicator of the present invention.
Figure 4B:
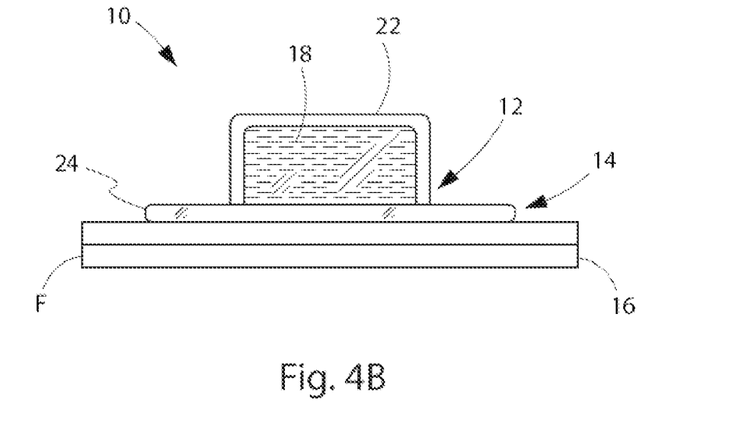
FIG. 4B shows a side view of one embodiment of the indicator of FIG. 4A.
Figure 4C:
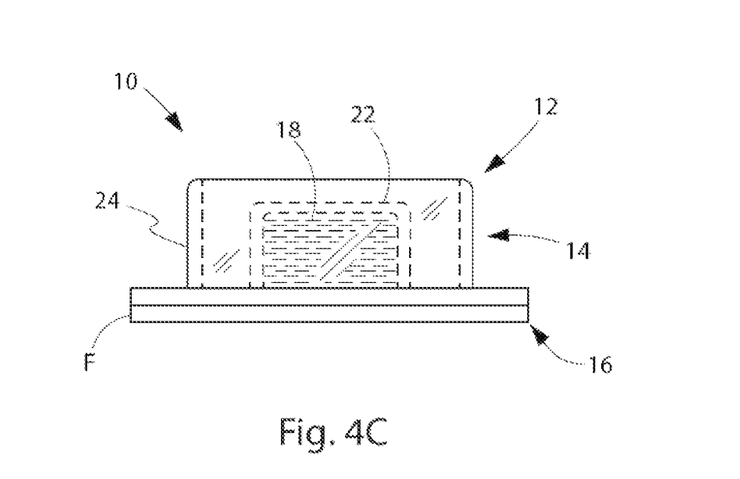
FIG. 4C shows a side view of another embodiment of the indicator of FIG. 4A.

FIG. 4A shows a top view of a third embodiment of the indicator device 10 of the present invention. FIG. 4B shows a side view of one embodiment of the indicator device 10 of FIG. 4A. FIG. 4C shows a side view of another embodiment of the indicator device 10 of FIG. 4A. In these embodiments, second and third chambers 24, 26 are curved or circular in shape, resulting is a different, and preferably smaller, footprint. In the embodiment shown in FIGS. 4A-4C, second and third chambers 24, 26 have been combined into a single second chamber 22 of a uniform cross-section. However, second and third chambers 24, 26 of different cross-sections, analogous to those shown in FIG. 1A, also can be used.

FIG. 4B illustrates an embodiment of curved second chamber 24 in which second chamber 24 maintains a constant cross-section throughout its length. As in the embodiment of FIG. 1A, as pressure is applied to the first chamber 22, the incompressible fluid is forced from the first chamber 22 into the second chamber 24. The progress of the incompressible fluid in the second chamber 24 indicates whether the desired pressure has been reached.

FIG. 4B also illustrates an optional bead or ball 52 contained within second chamber 24. Bead or ball 52 can act as an additional visual indicator of the progress of the incompressible fluid 18, as the incompressible fluid 18 will push the bead or ball 52 along the second chamber 24. Bead or ball 52 can be colored such that it is readily visible through the wall of second chamber 24, which can be transparent or translucent. Preferably, bead or ball 52 has an initial position at the juncture between first chamber 22 and second chamber 24. This embodiment also can comprise columns 30 to prevent inadvertent extrusion of the incompressible fluid 18 from the first chamber 22 due to mechanical pressure on the first chamber 22, analogous to the embodiment shown in FIGS. 3A and 3B.

FIG. 4C illustrates an alternative structure for second chamber 24 in which the second chamber 24 increases in height as the second chamber 24 wraps around the first chamber 22. As the second chamber 24 preferably is stiffer than the first chamber 22, the taller second chamber 24 can act analogously to columns 30 to prevent inadvertent extrusion of the incompressible fluid 18 from the first chamber 22 due to mechanical pressure on the first chamber 22. As such, second chamber 24 would have to have a height at least as high as the height of the first chamber 22.

Figure 4D:
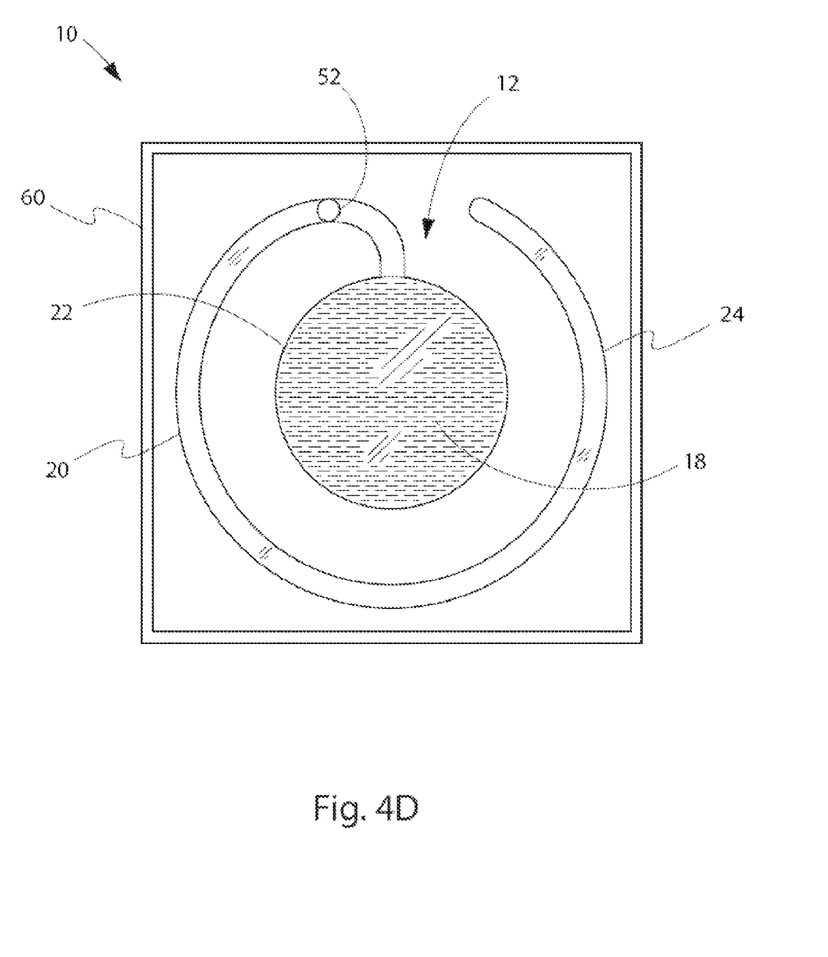
FIG. 4D shows a top view of another embodiment of the indicator of FIG. 4A.
Figure 4E:
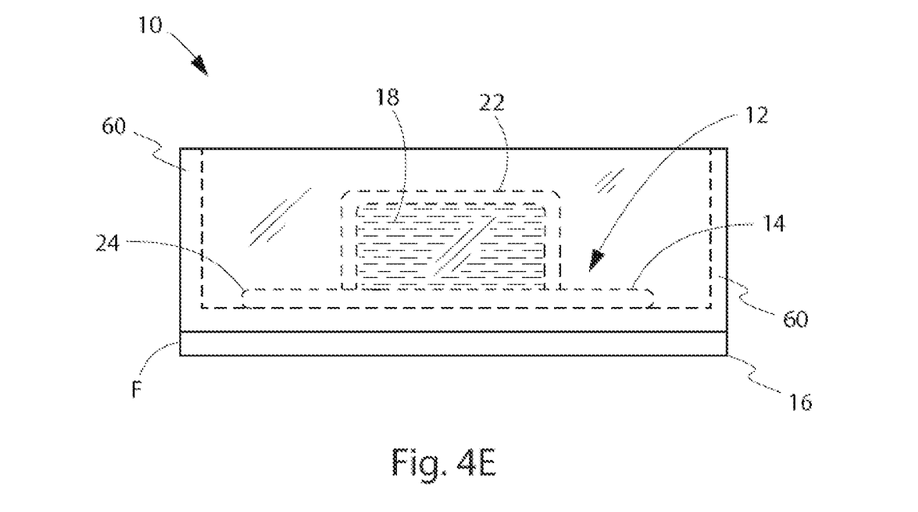
FIG. 4E shows a side view of the embodiment of the indicator of FIG. 4D.

FIG. 4D shows a top view of another embodiment of the indicator device 10 of FIG. 4A, and FIG. 4E shows a side view of the embodiment of the indicator device 10 of FIG. 4D. In this embodiment, a protective wall 60 is included about the edge of the indicator device 10. Wall 60 acts analogously to columns 30 to prevent inadvertent extrusion of the incompressible fluid 18 from the first chamber 22 due to mechanical pressure on the first chamber 22. More specifically, wall 60 is a relatively stiff structure that extends upwards a distance approximately at least as high as the height of first chamber 22. Wall 60 is formed from the same material as, and as a part of, top piece 14. Alternatively, wall 60 can be formed from a different material from, not a part of, and as an addition to top piece 14.

Figure 5:
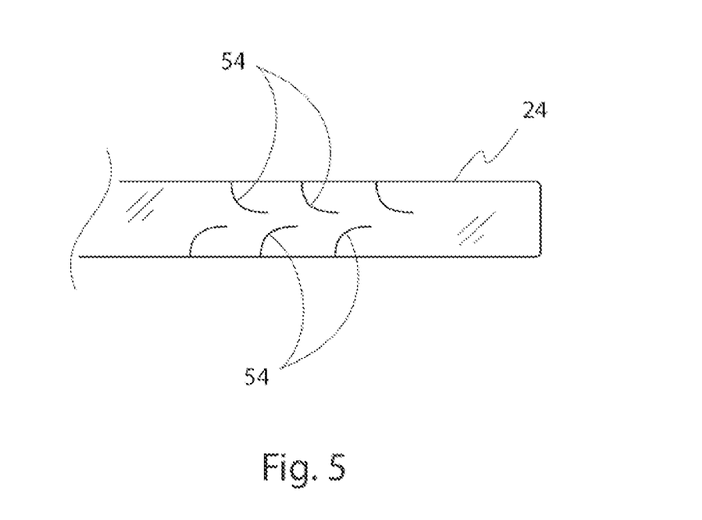
FIG. 5 shows a top cross sectional view of an alternate embodiment of an indicating chamber of the present invention.

FIG. 5 shows a top cross sectional view of an alternate embodiment of an indicating chamber 24, 26 of the present invention. In this embodiment, second chamber 24 comprise ridges 54 on the internal surface for catching and retaining the incompressible fluid 18 as an additional visual indicator of the progress of the incompressible fluid 18 along second chamber 24. Ridges 54 also can act as a check against the incompressible fluid 18 completely retreating back along second chamber 24 as the pressure is reduced on first chamber 22. Ridges 54 also can be located within third chamber 26.

Figure 6:
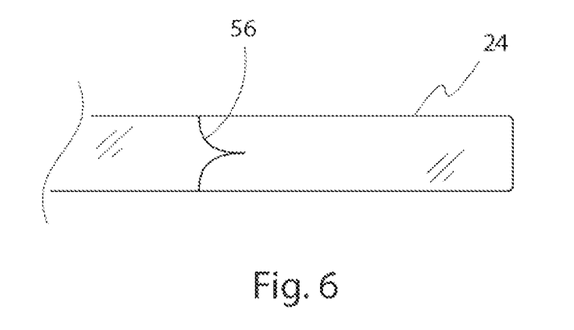
FIG. 6 shows a top cross sectional view of another alternate embodiment of an indicating chamber of the present invention.

FIG. 6 shows a top cross sectional view of another alternate embodiment of indicating chambers 24, 26 of the present invention. In this embodiment, second chamber 24 comprises valve 56 within the interior of second chamber 24 for catching and retaining the incompressible fluid 18 as an additional visual indicator of the progress of the incompressible fluid 18 along second chamber 24. Valve 56 also can act as a check against the incompressible fluid 18 completely retreating back along second chamber 24 as the pressure is reduced on first chamber 22. Valve 56 also can be located within third chamber 26.

The basic concept uses Boyles Law, namely that the volume of a gas 20 will change in a linear fashion when compressed by pressure:

$$V_2 = (P_1/P_2)V_1.$$

Where $V_2$ is the final volume of a gas 20 pressurized to a pressure of $P_2$,
$P_1$ is the initial pressure, and
$V_1$ is the initial volume.

The concept preferably uses an incompressible viscous fluid 18 such as grease or petroleum jelly, or other materials capable of being acted upon by a pressure force (all suitable materials will be referred to herein as "incompressible fluid"), encased in the flexible first chamber 22 that is adjoining transparent sealed stiff second chamber 24, and preferably another adjoining transparent sealed stiff third chamber 26, filled with a gas, such as air, so that when hydrostatic pressure is applied the incompressible fluid 18 is squeezed, much like a tube of toothpaste, into the adjoining chambers 24, 26 compressing the gas 20 in those chambers 24, 26 until an equilibrium is reached.

Figure 7:
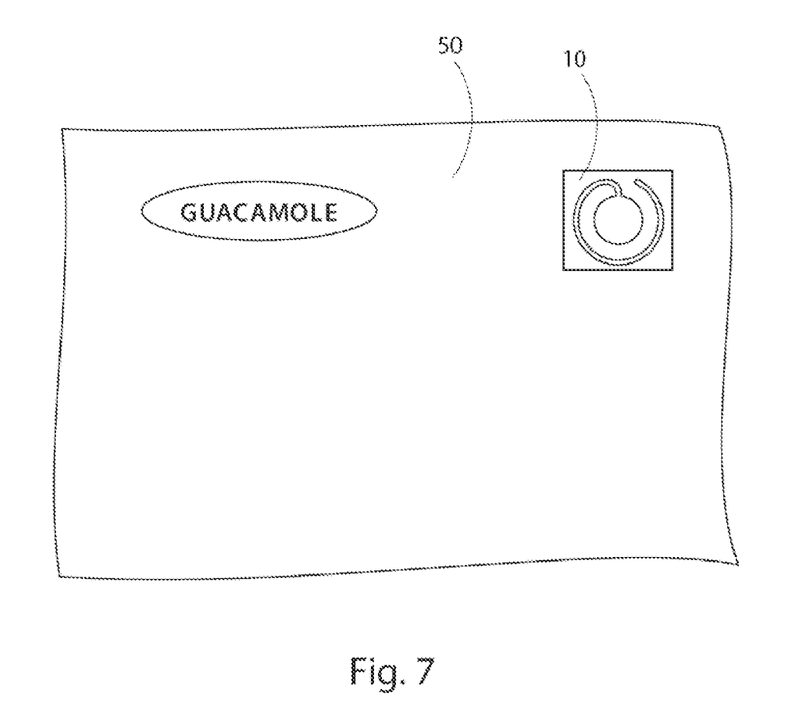
FIG. 7 shows the indicator attached to an item to be subjected to high pressure sterilization or pasteurization.

FIG. 7 shows the indicator device 10 attached to an item 50 to be subjected to high pressure sterilization or pasteurization. Item 50, such as a packaged food item, is to be subjected to high pressure sterilization or pasteurization. Indicator device 10 is place on (or near) the food item and is subjected to high pressure along with the food item. The indicator device 10 has been manufactured with a calibration to indicate that a certain pressure has been reached, such as 85,000 psi in the case of pasteurization of food items. The food item and the indicator device 10 are subjected to high pressure. The user can easily view the indicator device 10 to see if the incompressible fluid 18 has been forced to an appropriate position in the indicating chambers 24, 26, and/or if the bead or ball 52 has been moved to an appropriate position and/or if the incompressible fluid 18 has been retained by the ridges 54 or valve 56, whichever is present.

Although the invention has been described using an incompressible fluid, a minimally compressible fluid also is suitable, so long as the minimally compressible fluid behaves in a predictable and repeatable manner and can be calibrated based on pressure.

Representative materials for the incompressible fluid 18 include, but are not limited to, viscous greases (SAE viscosity of at most 100,000), gels, petroleum jelly, a vegetable oil such as blown rapeseed oil (Saybolt 800-900), an animal oil such as lard oil (Saybolt 200-210), or any high boiling point mixture of at least one incompressible fluid 18 and a solid pigment. A preferred grease has an NGLI (National Lubricating Grease Institute) Number of about 5, representing an NGLI work penetration of about 130-160 (0.1 mm at 25 C) and an NGLI consistency of very hard. For food applications, it can be preferable to use a non-toxic incompressible fluid 18.

Representative gases 20 that can be contained in second and third chambers 24, 26 include, but are not limited to, air and nitrogen. Other gases, such as non-toxic gases also are suitable.

Representative materials for the vessel 12 comprising chambers 22, 24, 26 include, but are not limited to, polyester films and other polymer films. Preferably, the material is transparent.

Representative materials for film F include, but are not limited to, polyester films and other polymer films. Preferably, the material is transparent.

While one application for the present indicator device 10 is for pasteurization it can also be used to indicate maximum depth for skin divers or other under water activities.

The indicator device 10 can be calibrated to indicate any desired pressure. Those skilled in the art can select the materials of manufacture, the incompressible fluid, and the gas without undue experimentation to produce an indicator device 10 for indicating the desired pressure.

The above detailed description of the embodiments, and the examples, are for illustrative purposes only and are not intended to limit the scope and spirit of the invention, and its equivalents, as defined by the appended claims. One skilled in the art will recognize that many variations can be made to the invention disclosed in this specification without departing from the scope and spirit of the invention.

What is claimed is:

1. A hydrostatic pressure indicator, comprising:
    a) a sealed vessel forming a fluid chamber and at least one indicating chamber in fluid communication with the fluid chamber;
    b) an indicating material contained within the fluid chamber; and
    c) a gas contained within the at least one indicating chamber;
    wherein the fluid chamber is configured to compress under a pressure force such that the indicating material extrudes out of the fluid chamber into the at least one indicating chamber, and such that the indicating material displaces or compresses the gas, thereby irreversibly indicating that a certain pressure has acted upon the fluid chamber; and
    wherein the indicating material is of sufficient viscosity to resist flowing out of the fluid chamber when the fluid chamber is uncompressed.

2. The indicator as claimed in claim 1, wherein the at least one indicating chamber is optically transparent and configured to change visually when coated by the indicating material.

3. The indicator as claimed in claim 2, wherein the internal surface of the at least one indicating chamber comprises a roughened or scarred surface.

4. The indicator as claimed in claim 1, wherein the at least one indicating chamber comprises an internal surface comprising ridges configured to retain the indicating material.

5. The indicator as claimed in claim 1, wherein the at least one indicating chamber comprises valves configured to retain the indicating material.

6. The indicator as claimed in claim 1, comprising at least two indicating chambers in fluid connection with each other and in fluid connection with the fluid chamber.

7. The indicator as claimed in claim 1, wherein the indicating material assumes an incompressible fluid flow when the fluid chamber is compressed and the indicating material is extruded out of the fluid chamber into the at least one indicating chamber.

8. The indicator as claimed in claim 7, wherein the indicating material is configured, based at least in part on its visco-elastic properties, to have a specific flow rate under the pressure force.

9. The indicator as claimed in claim 1, wherein the gas is air.

10. The indicator as claimed in claim 1, wherein the gas is nitrogen.

11. The indicator as claimed in claim 1, wherein the indicating material is a grease.

12. The indicator as claimed in claim 1, wherein the indicating material is a gel.

13. The indicator as claimed in claim 1, wherein the indicating material is a petroleum jelly.

14. The indicator as claimed in claim 1, wherein the indicating material is a vegetable oil.

15. The indicator as claimed in claim 1, wherein the indicating material is an animal oil.

16. The indicator as claimed in claim 1, further comprising structural protective columns at least partially surrounding the fluid chamber.

17. The indicator as claimed in claim 1, further comprising a valve between the fluid chamber and the at least one indicating chamber to prevent inadvertent flow of the indicating material from the fluid chamber into the at least one indicating chamber.

18. The indicator as claimed in claim 1, further comprising an indicator bead within the at least one indicating chamber.

19. A method for indicating whether a certain pressure has been reached, comprising the steps of:
    a) providing a sealed vessel having a fluid chamber in fluid communication with at least one indicating chamber, the fluid chamber containing an indicating material, and the at least one indicating chamber containing a gas, the fluid chamber configured to compress under a pressure force such that the indicating material extrudes out of the fluid chamber into the at least one indicating chamber, and such that the indicating material displaces or compresses the gas, thereby irreversibly indicating that a certain pressure has acted upon the fluid chamber, the indicating material of sufficient viscosity to resist flowing out of the fluid chamber when the fluid chamber is uncompressed;

b) subjecting the sealed vessel to the pressure force whereby the pressure force compresses the fluid chamber; and c) viewing the at least one indicating chamber to determine a distance the indicating material progressed within the at least one indicating chamber, thereby indicating that the or a certain pressure has been reached.

20. The method as claimed in claim 19, wherein the at least one indicating chamber is a stiffer chamber adjoining the fluid chamber, wherein the movement of the indicating material into the at least one indicating chamber increases the pressure in the at least one indicating chamber upon a hydrostatic pressure to the fluid chamber.

21. The method as claimed in claim 19, wherein the change in volume from the flow of the indicating material from the fluid chamber into the at least one indicating chamber is related to a hydrostatic pressure.

22. The method as claimed in claim 19, further comprising the step of using pigmentation in the indicating material to show total indicating material movement.

\* \* \* \* \*